United States Patent [19]

Cutler et al.

[11] Patent Number: 4,540,920

[45] Date of Patent: Sep. 10, 1985

[54] RELATING TO TAPE TRANSPORT CONTROL SYSTEMS

[75] Inventors: David S. Cutler, Wells; Keith G. Spouse, Feocck, both of England

[73] Assignee: EMI Limited, Hayes, England

[21] Appl. No.: 418,676

[22] Filed: Sep. 16, 1982

[30] Foreign Application Priority Data

Sep. 17, 1981 [GB] United Kingdom ................. 8128112

[51] Int. Cl.[3] ............................................ B65H 59/38

[52] U.S. Cl. .......................................... 318/7; 318/6; 242/75.46; 242/75.51

[58] Field of Search ..................... 318/6, 7; 242/75.44, 242/75.45, 75.46, 75.47, 75.51

[56] References Cited

U.S. PATENT DOCUMENTS 4,065,074 12/1977 Anderson et al. .................. 318/6 X
4,121,138 10/1978 Flint et al. ............................. 318/7

FOREIGN PATENT DOCUMENTS 52-36007 3/1977 Japan ................................ 242/75.45
54-112960 9/1979 Japan ................................ 242/75.45
1450028 9/1975 United Kingdom .
1450471 9/1976 United Kingdom .
1509859 5/1978 United Kingdom .

*Primary Examiner*—William M. Shoop, Jr.
*Assistant Examiner*—Bentsu Ro
*Attorney, Agent, or Firm*—Fleit, Jacobson, Cohn & Price

[57] ABSTRACT

A system capable of unbuffered transfer of magnetic tape between a take-up reel and supply reel comprises a control unit connected through a mode switching device to a respective linked error device and pulse width modulator, arranged to drive a respective take-up or supply reel motor. A tachometer monitors the amount of a pre-determined length of supply spool tape transferred to the take-up spool and the control unit accordingly evaluates proposed reel motor current levels. The mode switching device operates each motor in velocity or acceleration mode. In the velocity mode a phase locked loop connected to the tachometer and a control frequency output provides an error signal which can be applied to the selected motor current level. In the acceleration mode a motor current sensor output is compared with the proposed current level to derive another error signal which can be applied to the selected current level.

6 Claims, 2 Drawing Figures

TAKE-UP
SUPPLY
SWITCHING UNIT
SWITCHING UNIT
CURRENT SENSOR
CURRENT SENSOR
PWM
PWM
LOGIC UNIT
E
ERROR DEVICE
ERROR DEVICE
X
Y
Z
MODE SWITCHING
PHASE LOCKED LOOP
DAC
DAC
CENTRAL CONTROL UNIT
A
B
TU
L
D
VA
S

RELATING TO TAPE TRANSPORT CONTROL SYSTEMS

BACKGROUND OF THE INVENTION

This invention relates to tape transport control systems, applicable especially to, although not exclusively to, magnetic tape.

Unbuffered tape transport systems transfer tape directly from a supply reel, past reading and cleaning devices, to a take-up reel, necessitating strict control of tape tension, velocity and position during operation of the system. It is apparent that knowledge of the inertia of each reel allows control of the current applied to reel motors, to enable strict control of the reel torque hence tape acceleration tape tension and velocity. Algorithms for the derivation of the values are well known, for example BP. No. 1509859 (IBM Corp.). Therefore tape transport control circuitry may accurately control tape tension and velocity utilizing knowledge of the reel interia.

It is an object of the invention to provide an improved tape transport control system having accurate tape velocity and tension control in a simple, low power, compact arrangement.

SUMMARY OF THE INVENTION

According to one aspect of the invention there is provided a tape transport system comprises a central control unit connected firstly to a pulse switched servo unit connected to a take-up motor driving a take-up reel and secondly to a pulse switched servo unit connected to a supply motor driving a supply reel, the supply reel holding a predetermined length of tape; the system also including a tape transfer sensing means monitoring the amount of tape transferred between said reels, a tape velocity sensing means sensing velocity of said tape transfer, and a take-up motor current sensing means and a supply motor current sensing means; means causing the control unit to continuously evaluate selected motor current levels in response to signals received from said tape transfer sensing means and further means causing the control unit to operate said servo units in either a velocity mode, wherein an error signal derived from said velocity sensing means is applied to the selected motor current level, or in an acceleration mode, wherein an error signal derived from said motor current sensing means and said proposed selected current level is applied to the proposed current level.

Magnetic tape is transferred directly from an electric motor driven supply reel to an electric motor driven take-up reel. Each motor is controlled by a switching unit arranged to deliver to the motor a continuously evaluated current level, the switching unit being activated by a pulse width modulator. The evaluated current level is determined by a central control unit and relayed in an appropriate manner to the pulse width modulator. In one mode of operation wherein the tape is accelerated or decelerated, the actual motor current is compared with the evaluated current to produce an error signal applied to the pulse width modulator input. In a second mode of operation wherein the tape velocity is constant, actual tape velocity is compared with a predetermined tape velocity to produce an error signal applied to the pulse width modulator input.

BRIEF DESCRIPTION OF THE DRAWINGS

For a better understanding of the present invention, and to show how the same may be carried into effect, reference will now be made by way of example to the accompanying drawings, in which.

DESCRIPTION OF THE PREFERRED EMBODIMENT

Figure 1:
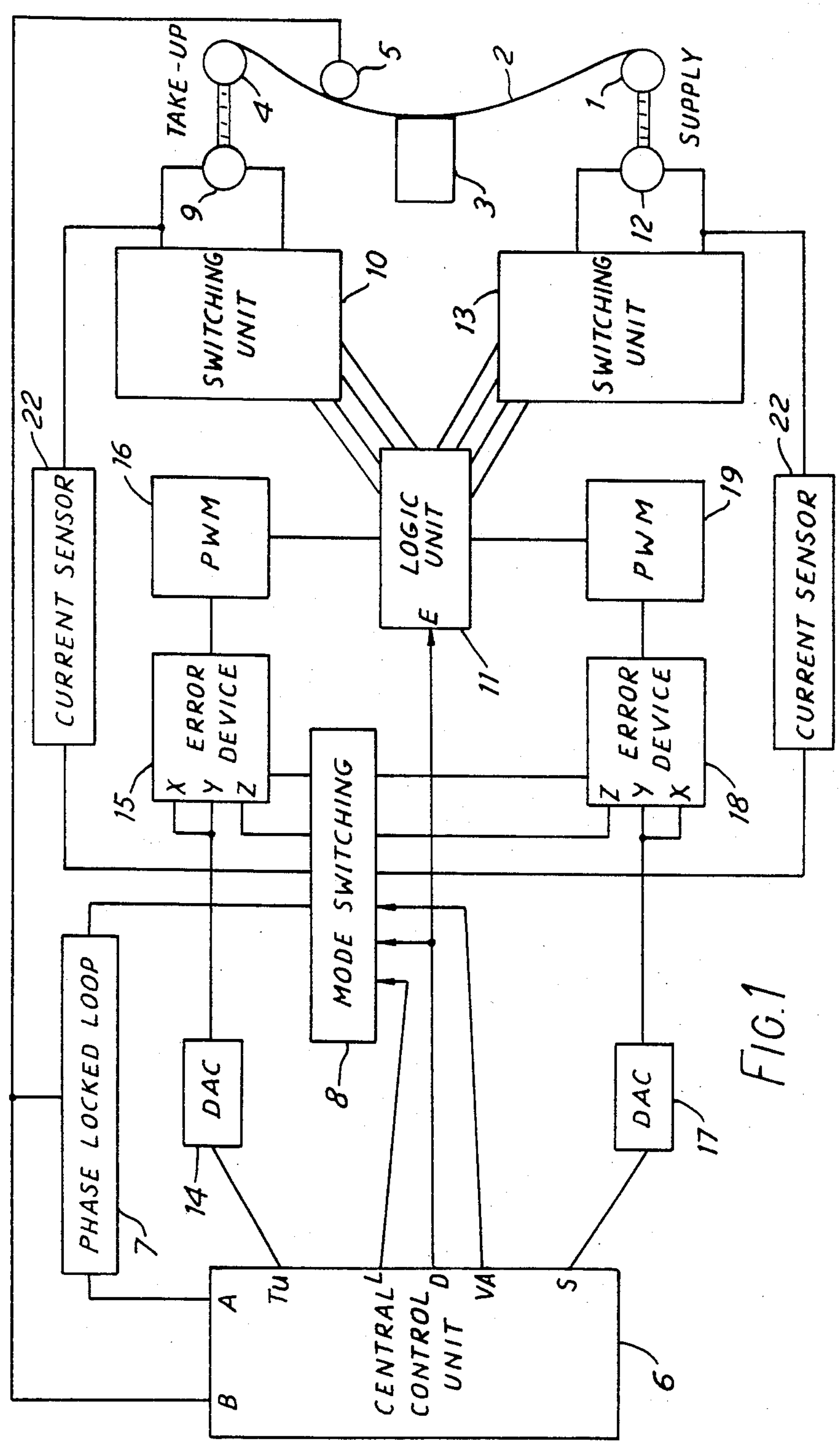
FIG. 1 illustrates a tape transport control system

A supply reel 1 feeds magnetic tape 2 past reading and cleaning devices 3 to a take-up reel 4. It will be appreciated that various configurations of tape transferal may be utilized and automatic or manual loading arrangements employed.

A tachometer 5 of known diameter is arranged to be rotated by tape 2 in normal operation. A signal produced from the tachometer, indicative of the passage of a known length of tape past the tachometer, is relayed to an input B of a central control unit 6. The central control unit may count the signals, thereby measuring the length of tape passing from one reel to another, and also monitor the rate of production of the signals, thereby monitoring the velocity of tape passing the tachometer.

Output signals from the tachometer are also relayed to a phase locked loop 7 being fed a reference frequency from an output A of control unit 6. An error signal between the reference frequency and the tachometer signal frequency is produced at the phase locked loop output and relayed to a mode switching device 8. Therefore when no error signal is produced the tape velocity will be equal to a velocity defined by the reference frequency, hence the phase locked loop forms a tape velocity sensing means.

The take-up reel 4 is driven by a motor 9 connected to a switching unit 10 linked to a logic unit 11. Similarly the supply reel 1 is driven by a motor 12 connected to a switching unit 13 linked to logic unit 11. The switching unit is illustrated in more detail in FIG. 2 and described hereinafter.

A digital to analogue converter 14 linked to an output $T_u$ of control unit 6 converts digital voltage signals at the output $T_u$ into an analogue form to be relayed through an error device 15 linked to a pulse width modulator 16. The modulator output being subsequently passed through logic unit 11 to the switching unit 10. This chain of components therefore forms a pulse switched servo unit for motor 9.

In parallel fashion a digital voltage from output S of control unit 6 is relayed through a digital to analogue converter 17 to an error device 18 connected to a pulse width modulator 19. The modulator output being subsequently passed through logic unit 11 to the switching unit 13. Therefore this chain of components forms a pulse switched servo unit for motor 12.

It will be apparent that a tape transport once in operation may have two modes of operation, firstly the tape transfer velocity is constant—the velocity mode, and secondly the tape transfer is accelerated or decelerated—the acceleration mode.

With an unbuffered system the motor currents within the supply and take-up reel motors must be set at a level to ensure a constant acceleration or a steady tape tension within the velocity mode. The currents required for each motor will vary in dependence on the torque required to turn the respective reels, which varies according to the amount of tape on each reel. Therefore the amount of tape transferred between reels is of critical importance. If the total tape length is known, then measurement of tachometer 5 signals as hereinbefore disclosed, allows central control unit 6 to evaluate the length of tape on each reel, and hence determine the weight of tape on each reel, provided tape width, density and thickness parameters are known. Therefore inclusion of reel hub and motor parameters allows the central control unit to evaluate the motor currents required to either accelerate the tape at a constant acceleration or maintain a constant tape tension in the velocity mode. It will be apparent that the relevant parameters change as a result of tape transfer and therefore the drive currents must be re-evaluated in a continuous manner.

In operation, supply reel 1 initially contains all the magnetic tape 2. As disclosed herein above, the tape length must be predetermined by suitable means and the parameter fed into control unit 6. Automatic loading requires typically the supply reel and take-up reel to rotate to give a constant tape velocity. Therefore initially an output L of the central control unit connected to mode switching device 8 ensures that the pulse switched servo units for motors 9 and 12 act in a "load" mode.

The central control unit evaluates the current $I_s$ for supply reel motor 12 and the current $I_{Tu}$ for take-up reel motor 9 to cause the reels to rotate at an angular velocity sufficient to give a constant tape transfer velocity.

In the "load" mode, the digital representations of $I_s$ and $I_{Tu}$ are fed to the respective digital to analogue converter from outputs S and Tu of control unit 6. The resultant analogue signals are fed through the respective error devices to the pulse width modulators and on to the respective switching units via logic unit 11. No error signals are relayed to error inputs of the error devices 15 and 18.

Figure 2:
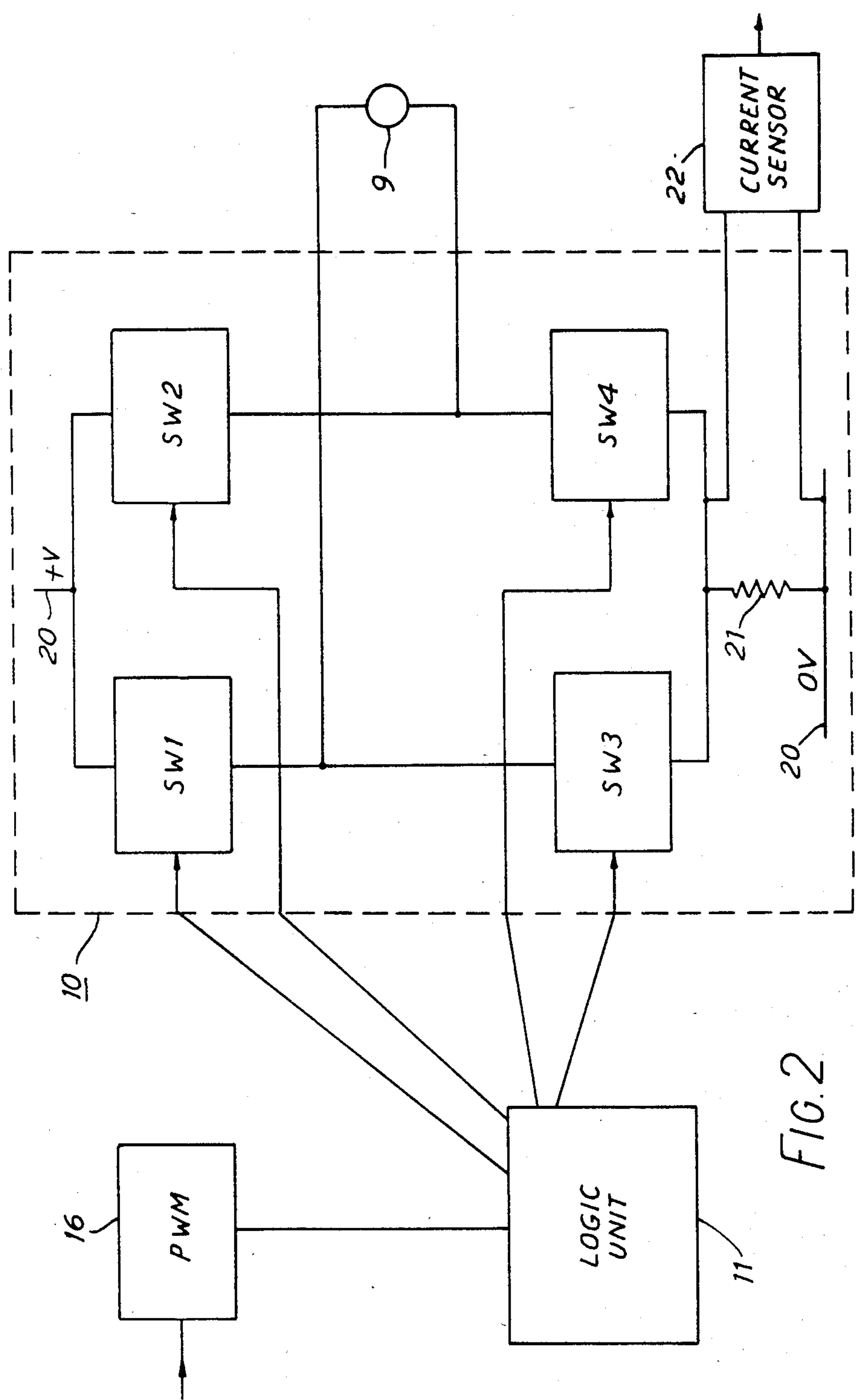
FIG. 2 illustrates a pulse switched servo unit including motor current sensing means.

The pulse width modulated representations of current $I_s$ and $I_{Tu}$, applied to switching units 10 and 13 respectively must ensure that the respective motors 9 and 12 rotate in an appropriate manner. Information about the direction of tape travel is relayed to an input E of logic unit 11 from an output D of control unit 6. The switching units 10 and 13 as illustrated in FIG. 2 comprise identically a transistor switch SW1, connected to a positive terminal of a voltage source 20 and to a resistor 21 through a power FET SW3. In a parallel fashion, a transistor SW2 is connected to the positive terminal of voltage source 20 and to the resistor 21 through a power FET SW4. The resistor is connected from power FET's SW3 and SW4 to a zero voltage terminal of voltage source 20. The respective reel motor is coupled across points A & B and a current sensing device 22 is coupled across the resistor 21, effectively detecting the current flowing through the motor.

The logic unit 11 is connected to the gates of all four transistors and operating either SW1 or SW2 in accordance with the direction information at the input E of the logic unit 11 to give the desired direction of current flow through the motor. The pulse width modulated representation of currents $I_s$ or $I_{Tu}$ are then fed to the appropriate FET's SW3 or SW4 to allow current to pass through the motor.

The current sensing device 22 associated with each switching unit is connected to an input of the associated supply or take-up pulse width modulator. This input places an upper bound on the reel motor current and effectively limits the reel motor current below a preset level associated with system malfunction. It is possible that the reel motor currents associated with loading may be temporarily above this preset level. It will be apparant to those skilled in the art that a different current limit may be applied by suitable means for the short period of loading.

Completion of loading may be detected when the tachometer produces signals, indicative that normal transfer of tape between the take-up and supply reel is occurring. When the central control unit detects this the transport system may be switched to an acceleration mode to transfer the tape to a starting position.

Therefore an output VA of the control unit 6 connected to the mode switching device, initiates the commencement of the acceleration mode required by causing it to switch error devices 15 and 18 into an acceleration mode. The values of $I_s$ and $I_{Tu}$ appropriate to a constant tape acceleration are evaluated by the control unit 6 with regard to the length of tape transfer having occurred, which is indicated by the tachometer 5 as hereinbefore described. The value of $I_{Tu}$ appearing at output Tu of control unit 6 is fed through digital to analogue convertor 14 to inputs X and Y of error device 15. The signal from the output of error device 15 is relayed through the appropriate circuitry to the switching unit 10 to cause an average current $i_{Tu}$ to pass through motor 9. The motor current $I_{Tu}{}^m$ is detected by current sensor 22 and fed back through mode switching device 8 and in the acceleration mode is passed to an input Z of error device 15.

In the acceleration mode, the inputs Z and Y of error device 15 are compared, that is to say $I_{Tu}{}^m$ and $I_{Tu}$ are compared, and the error therebetween is added to the signal at input X, which subsequently forms the output signal of the error device. Therefore deviations in actual motor current from the required motor current are corrected allowing accurate control of the motor current $I_{Tu}$ and hence the torque applied by motor 9 to the reel 4.

A parallel procedure occurs for the supply current $I_s$ through error device 18 and switching unit 13, thereby maintaining accurate control of the motor current $I_s$ and hence the torque applied by motor 12 to the reel 1 enabling constant acceleration of tape between supply and take-up reels. Clearly a similar sequence of events occurs when deceleration is required.

When the tape velocity $V_f$ required is attained, as indicated by the rate of production of tachometer signals, the control unit switches the transport system to a velocity mode in which the supply motor remains in the acceleration mode, but the take-up motor switches to a velocity mode. The requirement for a velocity mode for the take-up motor is transmitted from outputs D and L of control unit 6 to mode switching device 8. In the velocity mode the value of $I_{Tu}$ appearing at inputs X and Y of error device 15 is the value required by motor 9, evaluated by the control unit at that instant sufficient for the motor to maintain the tape velocity $V_f$. However deviations of tape velocity from the required velocity $V_f$ are detected by the phase locked loop 7 as described hereinbefore. The error signal issuing therefrom is, in the velocity mode transmitted through the mode switching device to input Z of the error device 15, whereas the output from current sensor 22 is blocked by device 8. The mode switching device also adjusts the error device 15 to function in a velocity mode. In this mode the error signal at the output Z is multiplied by the current value at input Y and the resultant value added to the signal at input X, which subsequently forms the output signal of the error device. Therefore deviations in actual tape velocity, from a value $V_f$set by the reference frequency fed to the phase locked loop are superimposed with the take-up reel current $I_{Tu}$ to correct it accordingly, allowing accurate control of the tape velocity.

Coincident with this procedure the current level $I_s$for the supply motor is defined at a level in order that the tension of the tape between reels is a fixed constant, typically 8 ounces of tension. Clearly, although the supply motor is in an acceleration mode it in fact may not need to accelerate. The current sensor correction is still applied through error device 18, which is still in an accelerating mode set by the mode switching device 8.

It will be apparent to those skilled in the art that the functions described herein, applicable to take up reel and supply reel are interchangeable when tape direction is reversed. In a typical system the tape velocity has two levels, for example 25 ips and 100 ips, clearly the reference frequency for the phase locked loop must be modified accordingly. Finally the pulse repetition rate of the pulse width modulators 16 and 19 may be chosen as required, for example 20 kHz is a typical value.

The pulse switched servo unit included in the tape transport control system allows efficient use of energy, that is to say energy is applied to the motors in pulses with minimal energy wastage between pulses. Therefore a compact system may be constructed having accurate control of tape velocity, tape tension and tape acceleration.

It will be understood that the embodiment illustrated shows an application of the invention in one form only for the purposes of illustration. In practice the invention may be applied to many different configurations, the detailed embodiments being straightforward for those skilled in the art to implement.

We claim:

1. A tape transport system comprising a control unit, a take-up motor for driving a take-up reel, a supply motor for driving a supply reel, and first and second pulse switched servo units coupling said control unit to said take-up motor and supply motor respectively, said pulse switched servo units each comprising an error device, a pulse width modulator for varying current to said associated motor, and a switching unit for reversing said motor current, the system further comprising a tape transfer sensing means for monitoring the length of tape transferred between said reels, a tape velocity sensing means for sensing deviations in velocity of said tape transfer from a predetermined required velocity, a take-up motor current sensing means and a supply motor current sensing means for sensing respectively deviations in take-up motor current and supply motor current from respective pre-determined motor currents, the control unit being arranged to evaluate respective selected current levels for the take-up and supply motors in response to signals received from said tape transfer sensing means, said error devices being arranged to generate correcting signals to correct said respective selected current levels, in dependence on said deviations sensed by said tape velocity sensing means or said respective motor current sensing means.

2. A system as claimed in claim 1, wherein, when said system is operating in an acceleration mode, said correcting signals for said respective selected current levels are both indicative of deviations sensed by said respective motor current sensing means.

3. A system as claimed in claim 1, wherein when said system is operating in a velocity mode, said correcting signal for said selected current level for said take-up motor is indicative of said deviation sensed by said tape velocity sensing means and said correcting signal for said selected current level for said supply motor is indicative of said deviation sensed by said supply motor current sensing means, so as to maintain the velocity and tension of the tape substantially constant.

4. A system as claimed in claim 1 wherein said velocity sensing means comprises a phase locked loop connected to said tape transfer sensing means and a frequency output of said control unit.

5. A system as claimed in claim 1 wherein said tape transfer sensing means comprises a tachometer.

6. A system as claimed in claim 1 wherein said motor current sensing means is connected to a maximum current limit input of said associated pulse switched servo unit.

* * * * *